United States Patent [19]
Schneider

[11] 3,880,715
[45] Apr. 29, 1975

[54] IMMUNOASSAY FOR HAPTENS
[75] Inventor: Richard S. Schneider, Sunnyvale, Calif.
[73] Assignee: Syva Company, Palo Alto, Calif.
[22] Filed: June 13, 1973
[21] Appl. No.: 369,696

[52] U.S. Cl............... 195/103.5 R; 195/59; 195/65; 195/102
[51] Int. Cl. ........................... C07g 7/02; C12k 1/00
[58] Field of Search ............ 195/103.5, 102, 62, 66, 195/59, 96, 65

[56] References Cited
UNITED STATES PATENTS
3,649,454  3/1972  Isono et al. ........................ 195/66 R
3,753,858  8/1973  Takasaki et al.................... 195/65 X OTHER PUBLICATIONS
Gorin et al., Assay of Lysozyme by its Lytic Action on Micrococcus Lysodeikticus Cells, Chemical Abstracts, Vol. 74, 1971, (p. 34), (49887m), QD1451.
Smolelis, et al., Factors Affecting the Lytic Activity of Lysozyme, Journal of Bacteriology, Vol. 63, No. 5, 1952, (pp. 665–674), QR658.
Rubenstein et al., "Homogeneous," Enzyme Immunoassay, A New Immunochemical Technique, Biochemical and Biophysical Research Communications, Vol. 47, No. 4, 1972, (pp. 846–851) QP501B43.

Primary Examiner—David M. Naff

[57] ABSTRACT
Haptens are determined by an immunoassay employing lysozyme and *Micrococcus lysodeikticus* cells wherein the response of bacterial cells to lysis by lysozyme is greatly stabilized by heating lyophilized dry bacterial cells at an elevated temperature for a time sufficient to improve the stability of the bacterial cells, when reconstituted as a suspension in an aqueous medium.

2 Claims, No Drawings

IMMUNOASSAY FOR HAPTENS

BACKGROUND OF THE INVENTION

Field of the Invention

Lysozyme is a relatively ubiquitous enzyme which attacks cell walls and lyses walls. In assaying for lysozyme *M. luteus* (*M.lysodeikticus*) is employed. By using a nephelometric technique, with the amount of light scattering being related to the concentration of unlysed bacterial cells, the amount of lysozyme can be determined. The bacteria are supplied as a dry formulation, which is then suspended in an aqueous medium for use. The reconstitution of the bacteria in an aqueous medium was found to give variable results, depending on the prior history of the bacteria. The bacteria, therefore, introduced an undesirable variation in result, since the lysozyme activity varied with the source and prior history of the bacteria.

SUMMARY OF THE INVENTION

Dry bacteria are heated at an elevated temperature for sufficient time, so that on aqueous reconstitution, a constant response to lysis by lysozyme is obtained, substantially independent of the history of the bacteria between the time of treatment and the time of reconstitution.

DESCRIPTION OF THE SPECIFIC EMBODIMENTS

The reproducibility and response of bacterial cells to lysis by lysozyme is greatly stabilized by heating lyophilized dry bacterial cells at an elevated temperature for a time sufficient to improve the stability of the bacterial cells, when reconstituted as a suspension in an aqueous medium.

The bacteria which are employed in the lysozyme assay are *Micrococcus lysodeikticus* (*M.luteus*). These bacteria are commercially available as lyophilized dry cells. In accordance with this invention, the dry cells are heated at a temperature of at least about 30°C and not greater than about 100°C, preferably not greater than 75°C for a time inversely related to temperature, ranging from a minimum of about 1 hour at 100°C to a maximum of about 1 week at 30°C with varying times and temperatures in between. The preferred range is a temperature of about 40°C to 60°C for a time from about 6 hours to 86 hours, more usually about 12 hours to 72 hours.

The bacteria are then suspended in an aqueous medium, which may be buffered or unbuffered, usually, if buffered, having a pH in the range of about 6 to 9. Various buffers may be used, such as borate, phosphate, tris-maleate, carbonate and the like. A useful concentration of the bacteria in an aqueous medium will generally be in the range of about 25–150mg per 100ml, preferably from about 75–125mg per 100ml.

The reconstituted bacteria after the heat treatment and in accordance with the subject invention can be stored for at least 6 weeks at 4°C and provide substantially reproducible results with lysozyme as compared with bacteria which have not been previously treated. These could only be stored for not greater than 7 days with any assurance of reliability.

The bacterial suspensions find particular use in an immunoassay technique, sold under the trademark EMIT by Syva Corporation. This technique is extensively described in U.S. patent application Ser. No. 143,609, filed May 14, 1971, now abandoned the disclosure of which is incorporated by reference. See also, German Offenlegungschrift, No. 2,223,385, the German counterpart which is incorporated by reference to the extent of the description of the immunoassay technique with lysozyme.

Broadly speaking, the invention concerns binding a hapten, e.g., morphine, to lysozyme. When the hapten-bound-lysozyme is combined with an antibody so that the antibody becomes bound to the hapten, the activity of the lysozyme is substantially reduced. If hapten is now added to the solution, the hapten can compete with the hapten which is present as the hapten-bound-lysozyme. By employing standardized solutions containing known amounts of hapten, one can relate the enzyme activity over a specified period of time to the concentration of the hapten which is present in the solution.

The procedure which is employed in carrying out the assay is exemplified for the opiate assay, which has morphine bound to lysozyme. Four solutions are prepared having respectively 0.0, 0.5, 5.0 and 50.0µg/ml of morphine. Various reagent solutions are prepared as follows. A buffer solution is prepared of tris-maleate, 0.025M, pH 6.0, by dissolving 3.03g of tris and 2.9g of maleic acid in 800ml of distilled water. After adjusting to pH 6 with 1N sodium hydroxide, the solution is diluted to a final volume of 1 l. A 0.1 weight percent bovine serum albumin (BSA) solution in the above buffer is prepared by diluting 1g of BSA in 1 l of the buffer. Bacteria (125mg) are dissolved in 100ml of the buffer. A solution containing carboxymethylmorphine conjugated to lysozyme is diluted with the BSA solution so as to obtain a reagent solution having a rate of lysis of about 0.180 ± 0.020 OD/min.

The active lysozyme content of the working solution is determined by measuring at 436nm the rate of bacterial lysis at 37°C. The assay solution is prepared by mixing 0.200ml of bacterial solution, 0.020ml of the BSA solution, 0.080ml of urine or substitute e.g., standard and 0.500ml of the enzyme solution. An antibody solution employed in the assay is 0.025M in tris-maleate buffer, pH 7.4, and is employed at a concentration and in a sufficient amount in the assay to inhibit 92–96% of the enzyme activity of the stock enzyme solution.

In carrying out the assay, 0.2ml of the bacterial suspension is pipetted into a flask to which is added 20µl of the antibody solution. The standard solution is then introduced carefully and 0.5ml of the enzyme solution added. The reaction mixture is then aspirated into the spectrometer and the decrease in optical density measured at 436nm for 10 seconds (any time interval from 10–60 seconds may be used) at 37°C.

In the following table, lyophilized *M.lysodeikticus* was treated in various ways, reconstituted by dissolving in urine, and the assay carried out at successively longer periods of time from the time of reconstitution. The bacterial suspension was maintained in a refrigerator at 4°C except at time of use. The following table indicates the results.

| Treatment Temperature °C | Pretreatment Time hours | Assay Time from Reconstitution days | Response in Opiate Assay Δ OD/min morphine μg/ml | | | |
|---|---|---|---|---|---|---|
| | | | 0.0 | 0.5 | 5.0 | 50.0 |
| 23 | 72 | 4 | 14 | 37 | 120 | 176 |
| | | 14 | 21 | 42 | 140 | 197 |
| | | 28 | 22 | 50 | 144 | 191 |
| | | 42 | 18 | 37 | 134 | 169 |
| 48 | 24 | 4 | 17 | 40 | 120 | 160 |
| | | 14 | 13 | 39 | 114 | 150 |
| | | 35 | 19 | 36 | 115 | 157 |
| | | 42 | 18 | 34 | 111 | 160 |
| 48 | 72 | 5 | 19 | 42 | 112 | 150 |
| | | 14 | 19 | 42 | 124 | 165 |
| | | 35 | 14 | 34 | 118 | 161 |
| | | 42 | 13 | 38 | 121 | 165 |
| 100 | 1 | 3 | 13 | 35 | 105 | 150 |
| | | 14 | 10 | 35 | 122 | 156 |
| | | 35 | 20 | 41 | 116 | 153 |
| 100 | 5 | 3 | 25 | 93 | 129 | |
| | | 14 | 5 | 28 | 104 | 141 |
| | | 35 | 10 | 32 | 110 | 131 |

In evaluating the results, there are two major considerations. The first consideration is reasonable consistency in the readings with the same standard solution over the period of time for the test. The second consideration is the range of units between each value, in order that clear demarcations be obtained between the different values. This enables one to obtain a semi-quantitative or quantitative determination of the amount of the hapten, i.e. morphine, which is present in the solution.

At the low temperature for the treatment, 23°C, there is substantial variation during the 42 day period, as to the value obtained with each standard. While the spread between the various standards is good, the spread varies significantly with the time for reconstitution.

At the higher temperature, 100°C, particularly for the extended time, the high value has a relatively low reading, so that the number of units between 5 and 50μg/ml of morphine is too small to be useful for a quantitative result. The remaining values show good spread, and reasonable consistency in results, so that one can obtain approximately the same value for the standard solution over relatively long periods of time, while at the same time having a significant number of units between each of the standards, so that one can quantitate the results.

It is evident from the above results that by mild elevated temperature treatment of bacteria over a reasonable period of time, the bacteria can be modified so as to provide consistent results in an assay employing lysozyme. In this manner, users of the assay can reconstitute relatively large volumes of the bacteria and use the reconstituted bacteria for long periods of time. Greater efficiency is achieved and economy in not having to repeatedly prepare new solutions over relatively short periods of time, with concomitant changes from one batch of bacteria to another.

Although the foregoing invention has been described in some detail by way of illustration and example for purposes of clarity of understanding, it will be obvious that certain changes and modifications may be practiced within the scope of the appended claims.

What is claimed is:

1. In a method for carrying out an immunoassay, wherein a hapten is covalently bound to lysozyme and the activity of the lysozyme is substantially reduced when the lysozyme to which the hapten is covalently bound is bound to an antibody for said hapten, and the content of the hapten in the solution is determined in the immunoassay as a result of free hapten in solution competing with hapten bound to lysozyme, which when bound to an antibody in the solution produces a different lysozyme activity, so that the amount of hapten bound to lysozyme which is bound to antibody is less in the presence of free hapten as compared to the absence of free hapten, and by employing standardized solutions containing known amounts of hapten and relating the lysozyme activity against *M. lysodeikticus* over a specified period of time to the concentration of hapten present in the standard solution, the improvement which comprises employing *M. lysodeikticus* in said immunoassay, as a substrate for said lysozyme, which has been heated in a lyophilized dry state at a temperature in the range of about 30°–100°C for a time in the range of about 1 hour to 86 hours, the time and temperature varying inversely.

2. In a method according to claim 1, wherein said time is in the range of 6 hours to 72 hours, and said temperature is in the range of about 40° to 75°C.

* * * * *